July 12, 1927.  
E. P. BULLARD, JR  
CUTTING COMPOUND DISTRIBUTION SYSTEM  
Filed Feb. 9, 1924  
1,635,702  
3 Sheets-Sheet 1

Inventor  
*Edward P. Bullard, Jr.*  
By Chamberlain & Newman  
Attorneys

July 12, 1927.

E. P. BULLARD, JR 1,635,702

CUTTING COMPOUND DISTRIBUTION SYSTEM

Filed Feb. 9, 1924 3 Sheets-Sheet 3

Inventor
Edward P. Bullard, Jr.

By Chamberlain & Newman
Attorneys

Patented July 12, 1927.

1,635,702

UNITED STATES PATENT OFFICE.

EDWARD P. BULLARD, JR., OF STRATFORD, CONNECTICUT, ASSIGNOR TO THE BULLARD MACHINE TOOL COMPANY, OF BRIDGEPORT, CONNECTICUT, A CORPORATION OF CONNECTICUT.

CUTTING COMPOUND DISTRIBUTION SYSTEM.

Application filed February 9, 1924. Serial No. 691,858.

This invention relates to a cutting compound distribution system, particularly for continuous multiple spindle turning machines of the type known in the trade as a "Contin-U-Matic". An object of the invention is to provide a system adapted to distribute the cutting compound or lubricant in an even and continuous manner to the cutting tools in contact with the work, and to continuously circulate the compound, to the end that a given quantity may be used over and over again.

A further object is to provide a system which will effectually separate the cuttings from the cutting compound, thereby facilitating the removal of the cuttings and insuring a recirculation of the used compound in a clarified condition.

Other objects are to provide a distribution system which may be economically built, conveniently installed upon machines in process of manufacture or already in use, and which will require a minimum of attention on the part of the operator.

With the above and other objects in view, an embodiment of the invention is shown in the accompanying drawings, and this embodiment will be hereinafter more fully described with reference thereto, and the invention will be finally pointed out in the claims.

In the drawings.

Similar reference characters indicate corresponding parts throughout the several figures of the drawings.

Figure 1:
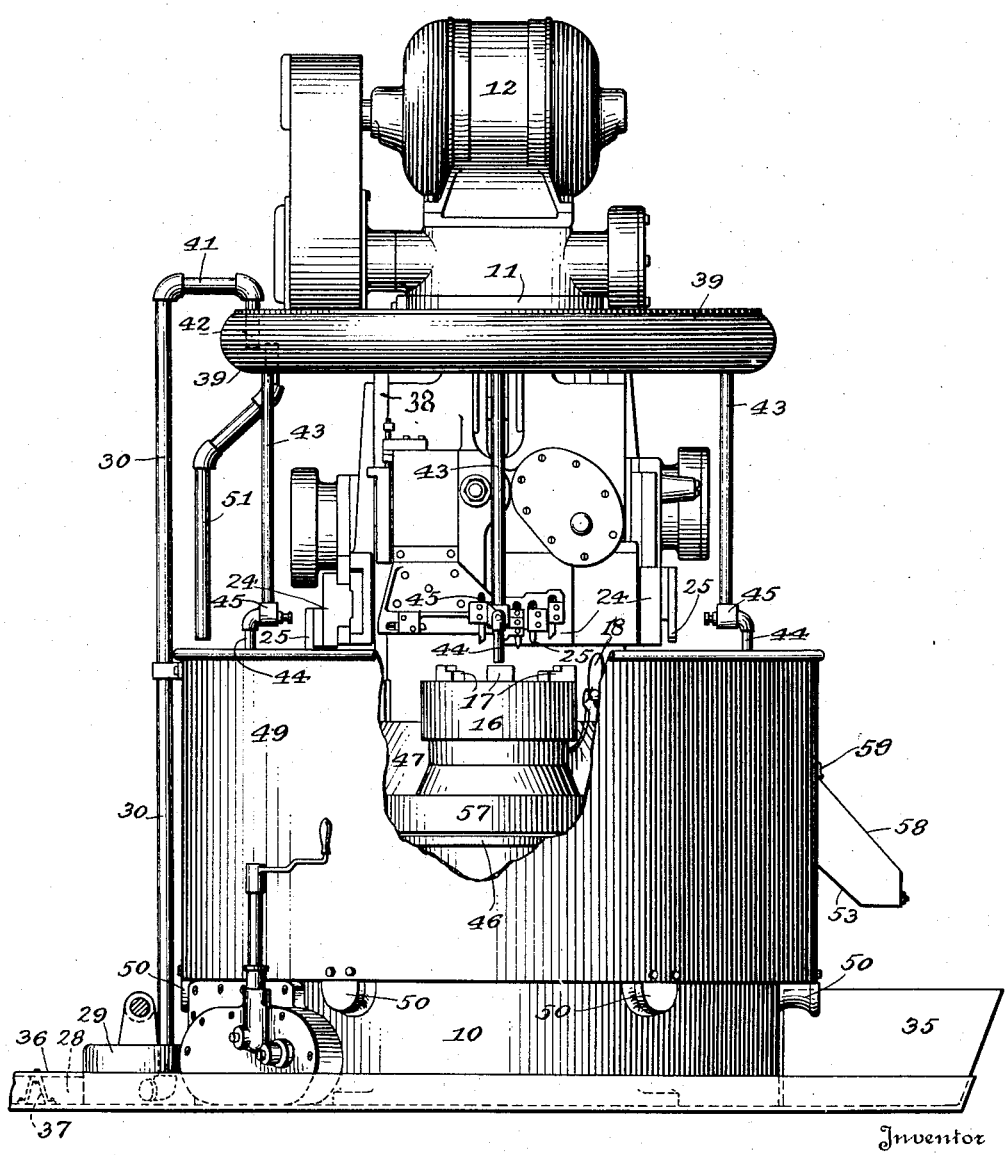
Fig. 1 is a side view of a continuous turning machine of the "Contin-U-Matic" type, provided with a distribution system according to the present embodiment of the invention.
Figure 2:
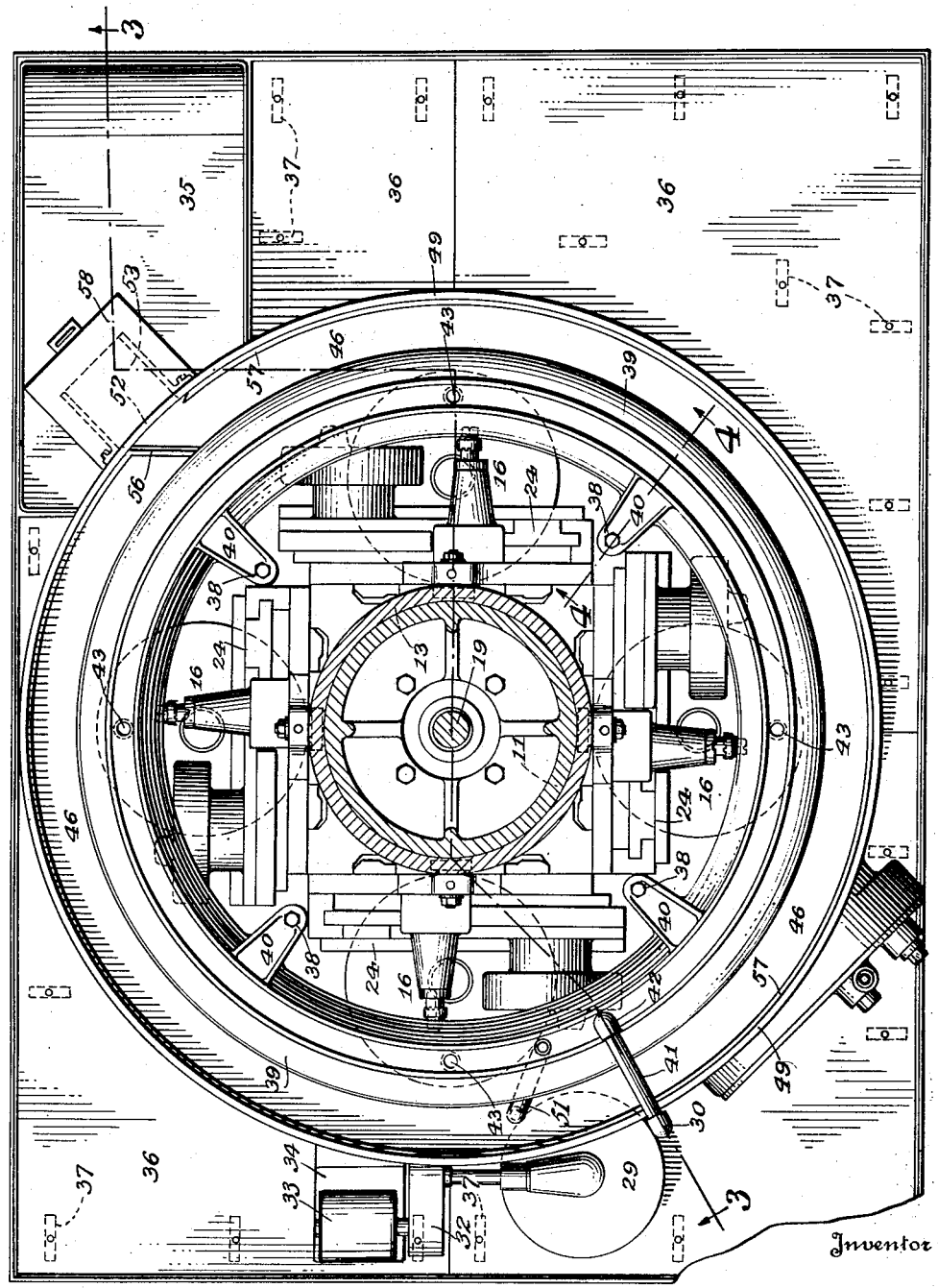
Fig. 2 is a sectional plan view thereof.

Referring to the drawings, the automatic machine in which the present cutting compound distribution system is incorporated is of the continuous turning type, known in the trade as a "Contin-U-Matic", and having a plurality of rotating work carrying tables with which movable tools cooperate.

The machine comprises a base 10, having a central hollow pedestal 11 upon the upper end of which a driving motor 12 is mounted, the pedestal being provided near its upper end with a tool operating cam 13. A rotatable carrier 14 is mounted upon bearings 15 to rotate relatively to the base and pedestal, and carries a series of radially disposed rotatable work tables 16 upon which the work is secured by chuck jaws 17, said jaws adapted to be automatically operated upon throwing the lever 18, as disclosed more fully in my co-pending application Ser. No. 680,180. The work tables are rotated from the motor 12 through a vertical shaft 19 in the pedestal and geared to said motor, and a vertical counter shaft 20 geared to and driven by the shaft 19 and which drives through its pinion 21 a ring gear 22 mounted to rotate on the pedestal and meshing with the gears 23 of the work table spindles. Tool slides 24 carrying tools 25 are mounted on the carrier in relation to each of the work tables, and are adapted to reciprocate during the rotation of the carrier through cooperation with the cam 13. The carrier is continuously driven by a worm pinion, indicated diagrammatically at 26, meshing with a ring gear 27 secured to the under side of the carrier, said worm being driven by a suitable motor (not shown).

The cutting compound distribution system comprises a reservoir in the form of a relatively large pan 28 engaged beneath the base 10 of the machine and extending outwardly at all sides thereof, a pump 29 being disposed therein and adapted to force the liquid compound upwardly through a vertically disposed pipe 30, the pump being provided with a laterally extending flange 31 secured to the base of the machine to fix the position of the pump in the pan. The pump is driven by gearing disposed in a gear box 32 from a motor 33 mounted on a shelf 34 secured to the base 10 in raised relation to the pan.

In one corner of the pan there is provided a removable relatively deep receptacle 35 adapted to receive the metal cuttings from the work, and perforated near its base, as at 35ª, to permit any liquid carried therein by the cuttings to drain into the pan 28. A sectional metal cover 36 is provided over the remaining area of the pan, being supported in raised relation to the base of the pan, and with its inner and outer edges spaced from the base 10 and the wall of the pan, by means of brackets 37 secured to the under surface of the cover sections and resting on the base of the pan. The entire peripheral edges of the pan are thus surrounded by a space through which the cutting compound, which is deposited thereon after use, will flow into the pan where it is recirculated through the action of the pump.

Figure 3:
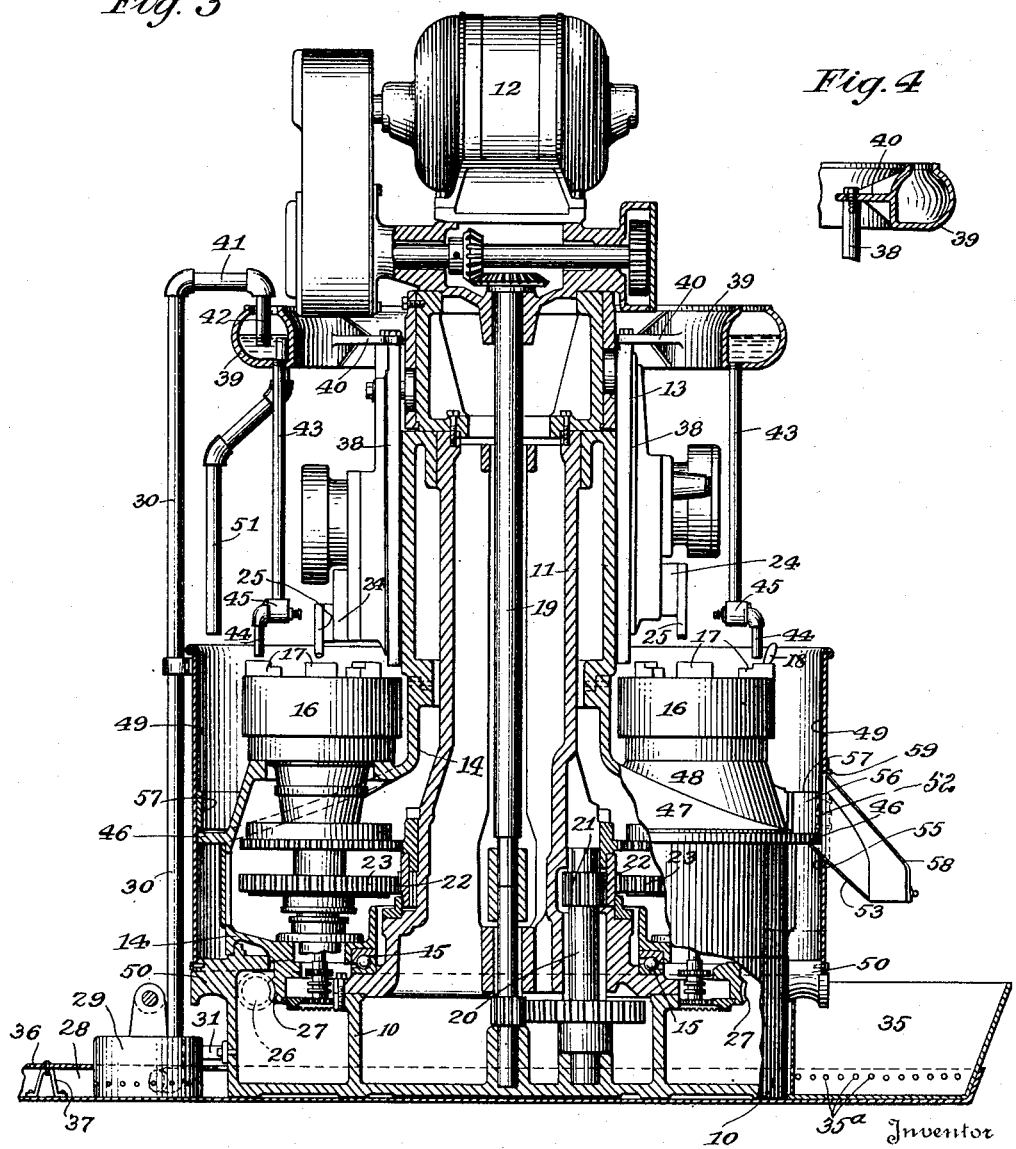
Fig. 3 is a vertical sectional view, taken along the line 3—3 of Fig. 2.
Figure 4:
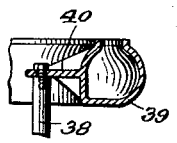
Fig. 4 is a detail sectional view taken along the line 4—4 of Fig. 2.

The carrier is provided at its upper end, and preferably as extensions of the tool slide supports, with a plurality of supporting standards 38, upon which an annular distributing reservoir 39 is supported by means of inwardly extending lugs 40 on said reservoir bolted to the supports, as shown clearly in Figs. 3 and 4. The reservoir 39 is substantially horse-shoe shape in cross section, and obviously rotates with and as a part of the carrier.

The vertical feed pipe 30 is provided at its upper end with an inwardly extending portion 41 having a downwardly directed vertical nozzle 42 extending into the channel ring through the annular opening thereof, and adapted to continuously supply the same with the cutting compound from the pan 28.

At suitable points in the under side of the reservoir ring there are secured a plurality of distribution pipes 43 extending vertically downward, and provided at their ends with outlet nozzles 44 disposed in such relation to the tools and work as to continuously supply the cutting compound thereto. The nozzles 44 are provided with a rotary valve 45 of the type adapted to be open in the downwardly disposed vertical position of the nozzle and to be closed upon swinging the nozzle upwardly, so that any of the nozzles may be individually shut off when desired.

The carrier 14 is provided below the work tables with an annular outwardly extending ledge or flange 46, the upper surface 47 of the carrier sloping downwardly thereto, while the mounting pedestals 48 for the work tables slope downwardly to the surface 47, so that as the cutting compound is flowed over the work and tools, it passes downwardly by gravity over the surfaces 48 and 47 to the ledge or flange 46, carrying the metal cuttings from the work with it.

A cylindrical skirt 49 supported and secured at its lower edge upon a series of projecting lugs 50 of the base 10, surrounds the flange 46 with sufficient clearance between the inner surface of the skirt and the periphery of the flange to permit the liquid cutting compound to flow downwardly over the periphery of the flange and along the inner surface of the skirt, and from which it drops upon the cover 36 and flows into the reservoir pan 28 over the edges of the cover, where it is recirculated through the system by the pump. The skirt extends above the flange 46 for such height as to confine any splashing of the compound from the tools.

In order to control the amount of the liquid cutting compound in the reservoir 39 an overflow pipe 51 is secured in the under surface thereof, its lower outlet end being within the skirt 49, while its upper end is at such height within the channel as to maintain a lever therein sufficiently below the upper annular opening as to prevent any overflow or splashing out of the same as the ring is rotated with respect to the submerged outlet nozzle 42 of the feed pipe.

The metal cuttings from the work are confined upon the ledge 46 and are adapted as the carrier is rotated to be automatically removed and deposited in the receptacle 35. For this purpose the skirt is provided above the receptacle with an opening 52 having its lower edge slightly below the lower surface of the flange, and provided with a downwardly directed inclined spout, the base portion 53 of which engages the lower edge of the opening and extends beneath the flange 46, while the side portions 54 are flanged, as at 55, and bolted at the sides of the opening. At the inner side of the skirt and along the edge of the opening forwardly of the direction of feed of the carrier there is secured an inclined or diagonally disposed deflector plate 56 engaging the upper surface of the flange 46 and adapted as the carrier rotates to deflect the cuttings from the flange onto the spout and into the receptacle 35. The deflector plate is preferably bent from the end of a circumferential band 57 extending about the inner surface of the skirt directly above the flange 46 and terminating at the rearward edge of the opening 52, and being adapted to effectually prevent the cuttings from working their way over the edge of the flange, and also receiving such wear through the abrasive action of the cuttings, as would otherwise be received by the skirt.

A cover 58 for the spout is hinged, as at 59, to the skirt at the upper side of the opening, its side walls, which rest at their vertical edges upon the surface of the skirt, being spaced from the side walls of the spout so as to direct any cuttings which may overflow the sides of the spout into the receptacle. The cover may also be raised to permit convenient access through the opening to the flange for the purpose of cleaning cuttings therefrom.

From the foregoing it will be seen that the system, according to the present embodiment of the invention, provides a stationary reservoir for the cutting compound, distribution means carried by and rotatable with the carrier for supplying the compound continuously to the work tables, and circulation means whereby the compound is continuously circulated from the reservoir to the distribution means, from such means to the tools, and back to the reservoir. The invention further comprehends the improved means by which the cuttings are separated from the compound in a manner as to maintain the latter clean, so that it may be repeatedly recirculated.

I have illustrated and described a preferred and satisfactory embodiment of the invention as applied to a particular type of machine, but it will be obvious that it can also be applied and used on other makes of machines, and that changes may be made therein, within the spirit and scope thereof, as defined in the appended claims.

Having thus described my invention, what I claim and desire to secure by Letters Patent is:

1. In a machine of the character described, the combination with a rotatable carrier and work supports carried thereby, of cutting compound distributing means carried by and rotatable with said carrier, reservoir means adapted to supply a cutting compound to said distributing means, means connected to said distributing means adapted to deliver the cutting compound to the work supports, means at one point adapted to deliver the combined lubricant and cuttings from the several work supports, and a removable receptacle adapted to receive the combined lubricant and cuttings and drain the lubricant into said reservoir means.

2. In a machine of the character described, the combination with a rotatable carrier and work supports carried thereby, of liquid receiving means carried by and rotatable with said carrier, a reservoir below said carrier, feed means adapted to feed liquid from said reservoir to said receiving means, distributing means connected to said receiving means adapted to deliver the liquid to the work supports, said carrier having an annular cuttings receiving portion above the level of the reservoir, and an annular skirt surrounding said portion adapted to retain the cuttings thereon and to feed the liquid to the reservoir 3. In a machine of the character described, the combination with a rotatable carrier and work supports carried thereby, said carrier having a continuous flange below said supports, of a liquid receiving means carried by and rotatable with said carrier, a stationary reservoir below said carrier, feed means adapted to feed liquid from said reservoir to said annular means, distributing means connected to said annular means adapted to deliver the liquid to the work supports, an annular skirt surrounding said flange of the carrier adapted to retain the cuttings thereon and to feed the liquid to the reservoir, and means adapted to remove the cuttings from the flange at a predetermined point through the rotation of the carrier.

4. In a machine of the character described, the combination with a rotatable carrier and work supports carried thereby, said carrier having a flange below said supports, of a liquid receiving means carried by and rotatable with said carrier, a reservoir below said carrier, feed means adapted to feed liquid from said reservoir to said receiving means, distributing means connected to said receiving means adapted to deliver the liquid to the supports, a skirt surrounding said flange of the carrier adapted to retain the cuttings thereon and to feed the liquid to the reservoir, said skirt having an outlet opening for said cuttings, a receptacle for said cuttings, and deflector means adjacent said opening adapted to remove the cuttings from said flange through said opening to said receptacle through the rotation of the carrier.

5. In combination, a rotatable carrier, a plurality of work supports on said carrier, a liquid receiving means supported above the work supports, a reservoir below the carrier, feed means adapted to feed liquid from said reservoir to said liquid receiving means, means connected to said receiving means adapted to deliver the liquid to the work supports from where it flows back to the reservoir, and means at one point adapted to remove the cuttings from the liquid while it is so flowing.

Signed at Bridgeport in the county of Fairfield and State of Connecticut this sixth day of February A. D., 1924.

EDWARD P. BULLARD, Jr.